(12) United States Patent
Soga

(10) Patent No.: US 12,728,716 B2
(45) Date of Patent: Sep. 8, 2026

(54) ELECTRIC EXCAVATOR

(71) Applicant: KOMATSU LTD., Tokyo (JP)

(72) Inventor: Masataka Soga, Tokyo (JP)

(73) Assignee: KOMATSU LTD., Tokyo (JP)

( * ) Notice: Subject to any disclaimer, the term of this patent is extended or adjusted under 35 U.S.C. 154(b) by 179 days.

(21) Appl. No.: 18/720,802

(22) PCT Filed: Dec. 20, 2022

(86) PCT No.: PCT/JP2022/046819

§ 371 (c)(1),
(2) Date: Jun. 17, 2024

(87) PCT Pub. No.: WO2023/120510

PCT Pub. Date: Jun. 29, 2023

(65) Prior Publication Data

US 2025/0050724 A1 Feb. 13, 2025

(30) Foreign Application Priority Data

Dec. 24, 2021 (JP) ................................ 2021-211124

(51) Int. Cl.

*B60K 1/04* (2019.01)
*E02F 3/32* (2006.01)
*E02F 9/08* (2006.01)
*H01M 50/204* (2021.01)
*H01M 50/249* (2021.01)
*H01M 50/262* (2021.01)

(52) U.S. Cl.

CPC .................. *B60K 1/04* (2013.01); *E02F 3/32* (2013.01); *E02F 9/0858* (2013.01); *H01M 50/204* (2021.01); *H01M 50/249* (2021.01); *H01M 50/262* (2021.01); *B60Y 2200/412* (2013.01)

(58) Field of Classification Search

CPC ..... B60K 1/04; B60K 2001/0416; E02F 3/32; E02F 9/0858; H01M 50/204; H01M 50/249; H01M 50/262; H01M 50/244

See application file for complete search history.

(56) References Cited

U.S. PATENT DOCUMENTS

2012/0325568 A1* 12/2012 Takeo ........................ E02F 9/24 180/65.245
2013/0075171 A1 3/2013 Noguchi et al.
2013/0078071 A1* 3/2013 Noguchi .................. B60K 1/04 414/719
2013/0313030 A1* 11/2013 Matsumura ............. B60L 50/64 180/68.5
2014/0262570 A1 9/2014 Sho et al.

(Continued)

FOREIGN PATENT DOCUMENTS

CN 102947512 A 2/2013
CN 103370477 A 10/2013

(Continued)

*Primary Examiner* — Timothy Hannon

(74) *Attorney, Agent, or Firm* — Faegre Drinker Biddle & Reath LLP

(57) ABSTRACT

A revolution frame includes a bottom plate and a main beam that rises upward from the bottom plate. The main beam extends in a forward/rearward direction in a central portion in a lateral direction of the revolution frame. A battery attachment support body is arranged on the main beam of the revolution frame.

7 Claims, 9 Drawing Sheets

(56) References Cited

U.S. PATENT DOCUMENTS

| | | | | |
|---|---|---|---|---|
| 2017/0052585 | A1* | 2/2017 | Podolefsky ......... | H01M 50/282 |
| 2021/0066688 | A1* | 3/2021 | Wu ....................... | E02F 9/0858 |
| 2022/0396931 | A1 | 12/2022 | Kishida et al. | |

FOREIGN PATENT DOCUMENTS

| | | | |
|---|---|---|---|
| CN | 104169504 | A | 11/2014 |
| CN | 206510970 | U | 9/2017 |
| CN | 110312835 | A | 10/2019 |
| JP | 2002-097666 | A | 4/2002 |
| JP | 2004-098728 | A | 4/2004 |
| JP | 2011-089357 | A | 5/2011 |
| JP | 2012-001933 | A | 1/2012 |
| JP | 2013-034698 | A | 2/2013 |
| JP | 2021-080691 | A | 5/2021 |

* cited by examiner

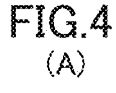
(A)
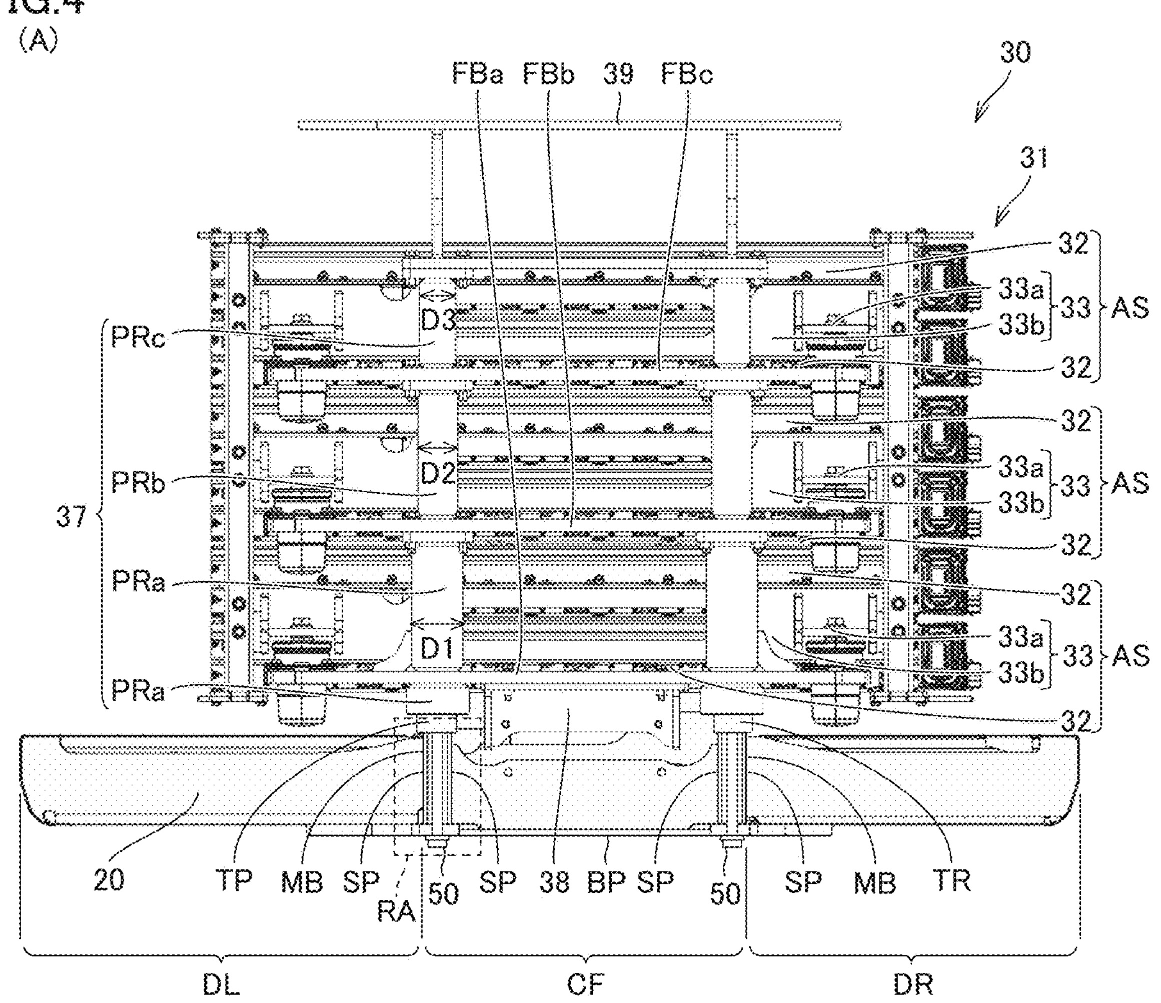
(B)
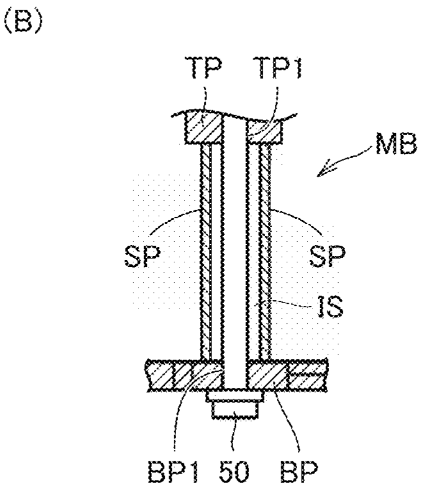

ELECTRIC EXCAVATOR

TECHNICAL FIELD

The present disclosure relates to an electric excavator.

BACKGROUND ART

For example, Japanese Patent Laying-Open No. 2021-80691 (PTL 1) discloses a construction in which a shelf where a battery is carried is arranged in a rear end portion of a machine-body frame in an electric drive hydraulic excavator.

CITATION LIST

Patent Literature

PTL 1: Japanese Patent Laying-Open No. 2021-80691

SUMMARY OF INVENTION

Technical Problem

In the construction in PTL 1, strength of the entire rear end portion of the machine-body frame where the shelf is arranged should be improved to support a weight of the battery. Therefore, for application to an electric excavator, design of the machine-body frame should significantly be changed.

An object of the present disclosure is to provide an electric excavator capable of appropriately supporting a battery with a simplified structure while change in design of a revolution frame is suppressed.

Solution to Problem

An electric excavator in the present disclosure includes a revolution frame and a battery attachment support body. The revolution frame includes a bottom plate and a main beam that rises upward from the bottom plate. The main beam extends in a forward/rearward direction in a central portion in a lateral direction of the revolution frame. The battery attachment support body is arranged on the main beam of the revolution frame.

Advantageous Effects of Invention

According to the present disclosure, an electric excavator capable of appropriately supporting a battery with a simplified structure while change in design of a revolution frame is suppressed can be obtained.

BRIEF DESCRIPTION OF DRAWINGS

FIG. 4 is (A) a rear view showing a state of attachment of the battery structure body shown in FIG. 2 to the revolution frame and (B) an enlarged vertical cross-sectional view at a fastening member 50 in a region RA in (A).

DESCRIPTION OF EMBODIMENTS

Figure 1:
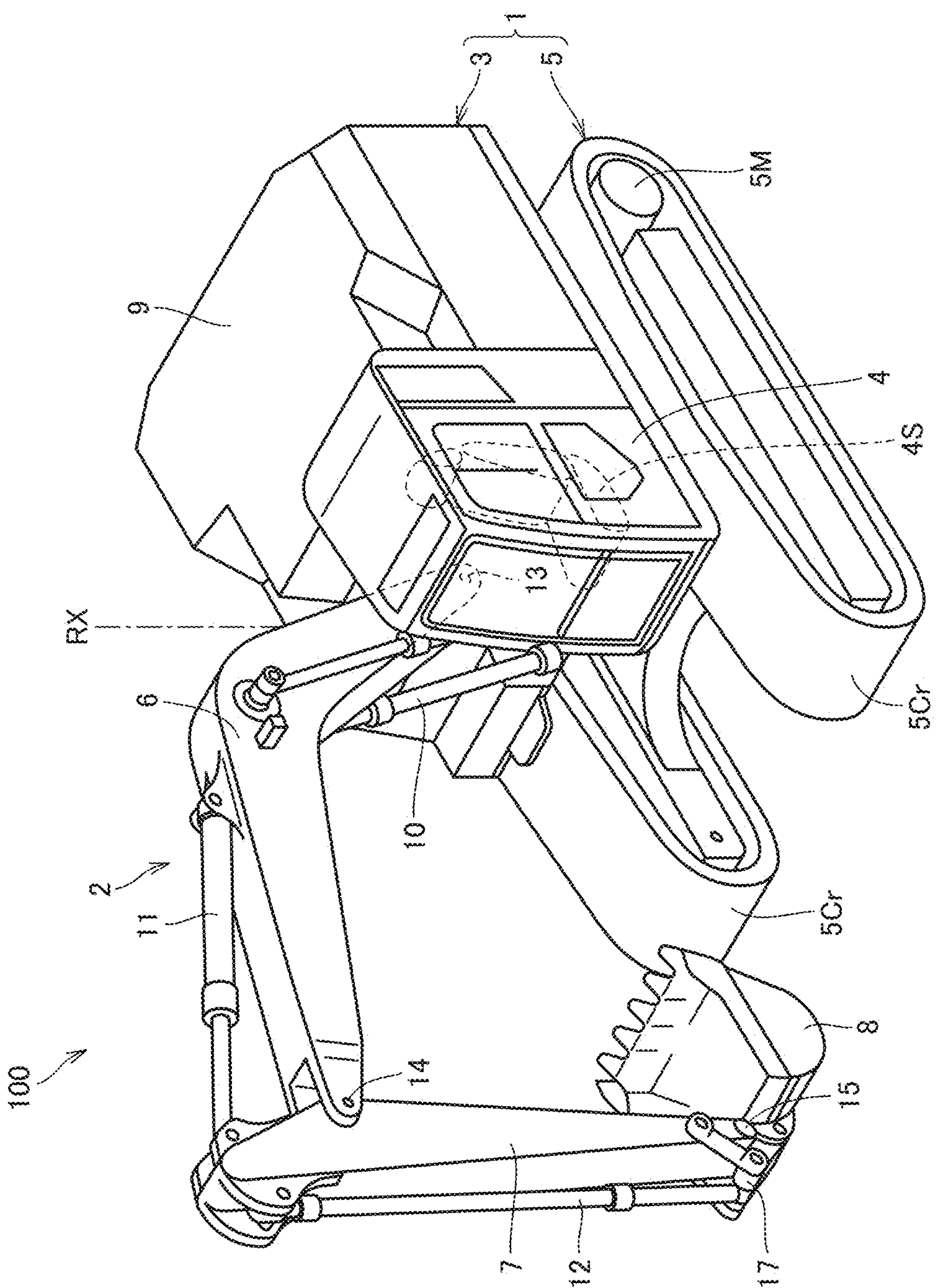
FIG. 1 is a perspective view schematically showing a construction of an electric excavator in one embodiment of the present disclosure.

An embodiment of the present disclosure will be described below with reference to the drawings.

In the specification and the drawings, the same or corresponding components have the same reference characters allotted and redundant description will not be repeated. For the sake of convenience of description, features may not be shown or may be simplified in the drawings. At least a part of an embodiment and a modification may freely be combined.

In the description below, "upward/upper/above", "downward/lower/below", "front", "rear", "left", and "right" indicate directions with an operator seated in an operator's seat 4S in an operator's cab 4 shown in FIG. 1 being defined as the reference. An electric excavator 100 may be an electric drive excavator including an electric motor as a drive source or a hybrid excavator including an engine and an electric motor as drive sources. Electric excavator 100 may be of a type in which a hydraulic actuator is activated with drive force from the electric motor or of a type in which an electric actuator is activated with drive force from the electric motor.

<Construction of Electric Excavator>

A construction of an electric excavator in the present embodiment will initially be described with reference to FIG. 1.

FIG. 1 is a perspective view schematically showing a construction of an electric excavator in one embodiment of the present disclosure. As shown in FIG. 1, electric excavator 100 includes a main body 1 and a work implement 2 activated by a hydraulic pressure. Main body 1 includes a revolving unit 3 and a travel unit 5.

Travel unit 5 includes a pair of crawler belts 5Cr and a travel motor 5M. Electric excavator 100 can travel by rotation of crawler belts 5Cr. Travel motor 5M is provided as the drive source of travel unit 5. Travel motor 5M is a hydraulic motor activated by a hydraulic pressure. Travel unit 5 may include a wheel (tire).

Revolving unit 3 is arranged on travel unit 5 and supported by travel unit 5. Revolving unit 3 is revolvable with respect to travel unit 5 around a revolution axis RX by a revolution motor (not shown). The revolution motor is a hydraulic motor activated by a hydraulic pressure. Revolution axis RX is a virtual straight line defined as a center of revolution of revolving unit 3. Travel motor 5M or the revolution motor may be an electric motor.

Revolving unit 3 is provided with operator's cab 4 (*cab*). Operator's seat 4S where the operator is seated is provided in operator's cab 4. The operator (occupant) who rides in operator's cab 4 can control a work implement 2, control revolving unit 3 to perform a revolution operation with respect to travel unit 5, and control travel unit 5 to run electric excavator 100. Electric excavator 100 may remotely be controlled.

Work implement 2 is supported by revolving unit 3. Work implement 2 includes a boom 6, an arm 7, and a bucket 8. Work implement 2 further includes a boom cylinder 10, an arm cylinder 11, and a bucket cylinder 12.

Boom 6 is pivotably connected to main body 1. Specifically, boom 6 has a base end pivotably connected to revolving unit 3 with a boom foot pin 13 (FIG. 2) being defined as a fulcrum. Arm 7 is pivotably connected to boom 6. Specifically, arm 7 has a base end pivotably connected to a tip end of boom 6 with a boom top pin 14 being defined as a fulcrum. Bucket 8 is rotatably connected to arm 7. Specifically, bucket 8 has a base end pivotably connected to a tip end of arm 7 with an arm top pin 15 being defined as a fulcrum.

Boom cylinder 10 has one end connected to revolving unit 3 and has the other end connected to boom 6. Boom 6 can be driven with respect to main body 1 by boom cylinder 10. This drive can pivot boom 6 in an upward/downward direction with respect to revolving unit 3, with boom foot pin 13 being defined as the fulcrum.

Arm cylinder 11 has one end connected to boom 6 and has the other end connected to arm 7. Arm 7 can be driven with respect to boom 6 by arm cylinder 11. This drive can pivot arm 7 in the upward/downward direction or a forward/rearward direction with respect to boom 6, with boom top pin 14 being defined as the fulcrum.

Bucket cylinder 12 has one end connected to arm 7 and has the other end connected to a bucket link 17. Bucket 8 can be driven with respect to arm 7 by bucket cylinder 12. This drive can pivot bucket 8 in the upward/downward direction with respect to arm 7, with arm top pin 15 being defined as the fulcrum.

Each of boom cylinder 10, arm cylinder 11, and bucket cylinder 12 is a hydraulic cylinder and driven by a hydraulic pressure.

Revolving unit 3 includes an exterior cover 9. Exterior cover 9 covers a machine room. A battery structure body 30 (FIG. 2) and the like are arranged in the machine room.

<Construction of Revolution Frame and Battery Structure Body>

A construction of a revolution frame 20 and battery structure body 30 in electric excavator 100 shown in FIG. 1 will now be described with reference to FIGS. 2 to 4.

Figure 2:
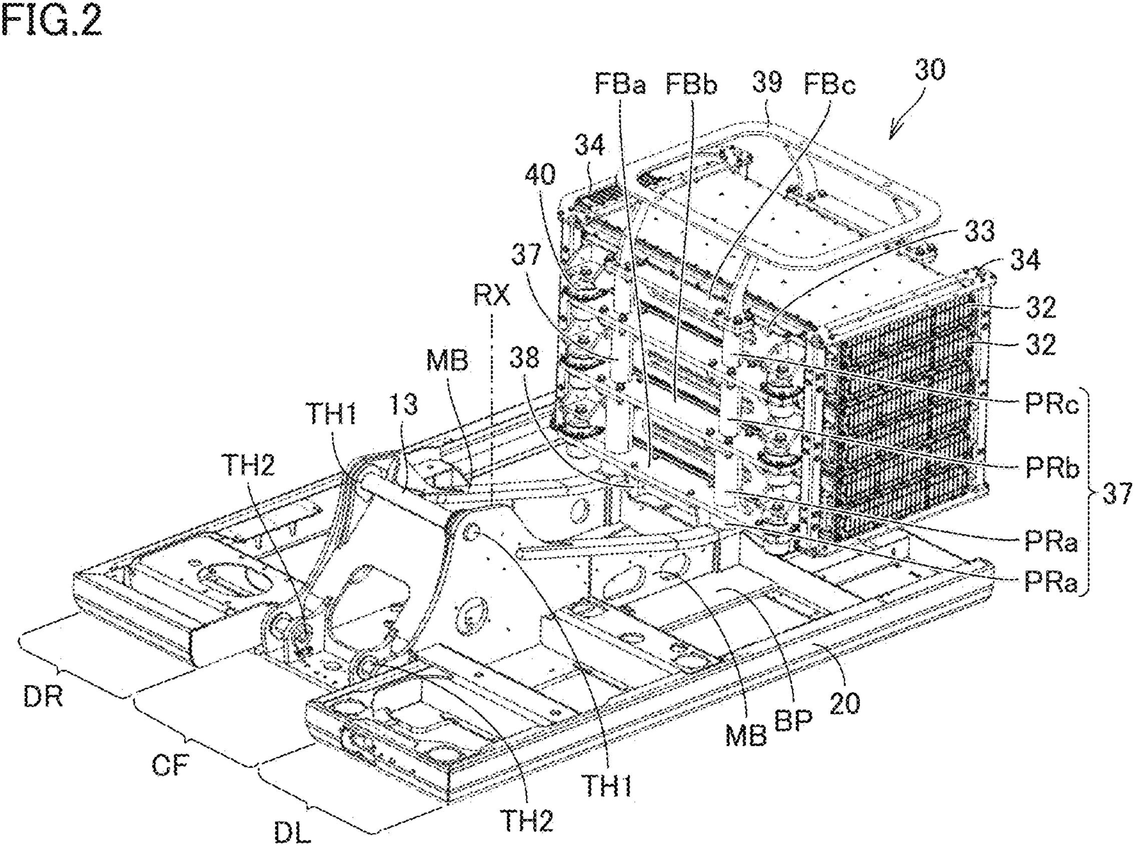
FIG. 2 is a perspective view showing a construction of a battery structure body and a revolution frame in the electric excavator shown in FIG. 1.

FIG. 2 is a perspective view showing a construction of the battery structure body and the revolution frame in the electric excavator shown in FIG. 1. FIG. 3 is an exploded perspective view of the battery structure body shown in FIG. 2. FIG. 4 is (A) a rear view showing a state of attachment of the battery structure body shown in FIG. 2 to the revolution frame and (B) an enlarged vertical cross-sectional view at a fastening member 50 in a region RA in (A).

As shown in FIG. 2, revolving unit 3 (FIG. 1) includes revolution frame 20. Revolution frame 20 revolves with respect to travel unit 5 (FIG. 1) around revolution axis RX. Revolution frame 20 includes a center frame CF, a left deck DL, and a right deck DR. Center frame CF is located substantially in the center in the lateral direction of revolution frame 20. Left deck DL is arranged on the left of center frame CF. Right deck DR is arranged on the right of center frame CF.

Revolution frame 20 includes a bottom plate BP and a pair of main beams MB. One and the other of the pair of main beams MB are arranged as being opposed to each other at a distance in the lateral direction. Each of the pair of main beams MB protrudes upward from bottom plate BP.

Each of the pair of main beams MB extends in the forward/rearward direction in a central portion in the lateral direction of revolution frame 20. The central portion means a region where center frame CF of revolution frame 20 is arranged. Each of the pair of main beams MB is arranged in center frame CF. The pair of main beams MB is, for example, in parallel to each other. Each of the pair of main beams extends to a rearmost end of center frame CF.

The pair of main beams MB supports work implement 2 (FIG. 1). Center frame CF thus supports work implement 2. Each of the pair of main beams MB is provided with through holes TH1 and TH2. Boom foot pin 13 is inserted in through hole TH1. Boom foot pin 13 rotatably supports boom 6 (FIG. 1) on the pair of main beams MB.

A pin (not shown) that supports boom cylinder 10 (FIG. 1) is inserted in through hole TH2. This pin rotatably supports boom cylinder 10 on main beams MB.

Battery structure body 30 is arranged in a rear end portion of revolution frame 20. Battery structure body 30 is arranged on upper ends of the pair of main beams MB.

Figure 3:
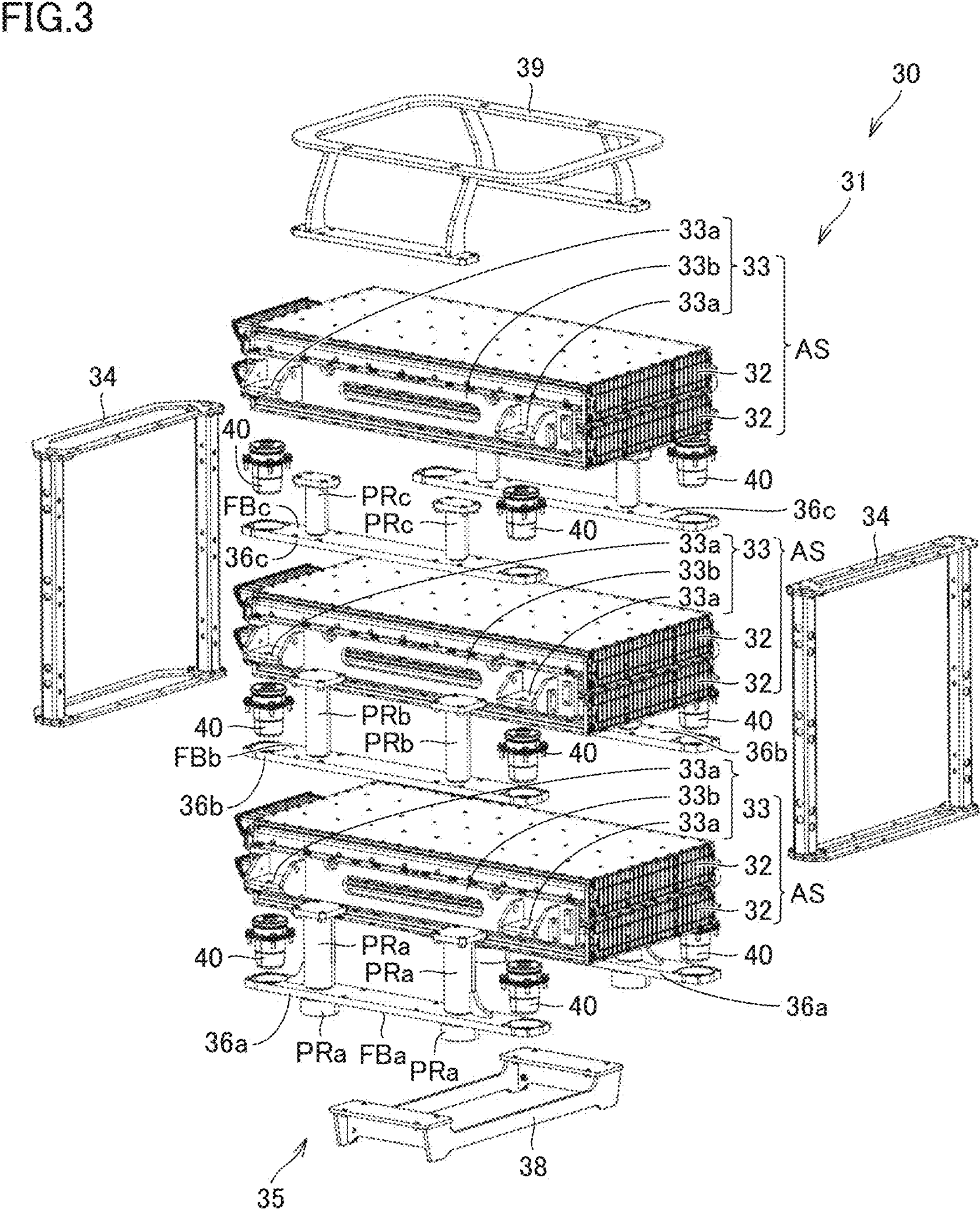
FIG. 3 is an exploded perspective view of the battery structure body shown in FIG. 2.

As shown in FIG. 3, battery structure body 30 includes a battery frame 31, a frame body 35, and a plurality of damper mounts (damping members) 40. Battery frame 31 includes at least one battery assembly (for example, three battery assemblies) AS and at least one frame (for example, two frames) 34.

Battery assembly AS includes at least one battery pack (for example, two battery packs) 32 and at least one bracket body 33 (for example, two bracket bodies) 33. Two battery packs 32 are vertically layered. Two vertically layered battery packs 32 are fixed to each other, for example, by two bracket bodies 33.

One of two bracket bodies 33 is arranged in front of two battery packs 32 and the other of two bracket bodies 33 is arranged in the rear of two battery packs 32. Bracket body 33 is fixed to each of lower battery pack 32 and upper battery pack 32, for example, with a bolt.

Battery pack 32 includes, for example, a plurality of battery modules. Each of the plurality of battery modules includes, for example, a plurality of battery cells (unit batteries). A positive electrode and a negative electrode are alternately connected in the plurality of battery cells in a battery module.

Bracket body 33 includes at least one bracket (for example, two brackets) 33*a* and a support plate 33*b*. Support plate 33*b* is formed, for example, from a flat plate. One of two brackets 33*a* is arranged at one longitudinal end of support plate 33*b* and the other of two brackets 33*a* is arranged at the other longitudinal end of support plate 33*b*. Each of two brackets 33*a* is fixed to support plate 33*b*, for example, by welding. Each of two brackets 33*a* protrudes from support plate 33*b*. Each of two brackets 33*a* is a portion to be attached to a damper mount 40.

A plurality of (for example, three) battery assemblies AS are layered in the upward/downward direction. In battery structure body 30, for example, six battery packs 32 are thus vertically layered. A layered structure of three battery assemblies AS is fixed by two frames 34.

Each of two frames 34 is, for example, in a rectangular frame shape. Each of two frames 34 is attached, for example, to a lateral end of the layered structure of the plurality of battery assemblies AS. In other words, one of two frames 34 is attached to one lateral end of the layered structure of the plurality of battery assemblies AS and the other of two frames 34 is attached to the other lateral end of the layered structure of the plurality of battery assemblies AS.

Each of two frames 34 surrounds, for example, (front, rear, upper, and lower sides of) the layered structure of three battery assemblies AS. Frame 34 is fixed to both of bracket 33*a* and support plate 33*b*, for example, with such a fastening member as a bolt.

While the plurality of battery assemblies AS are fixed by two frames 34, a plurality of (for example, six) brackets 33*a* located in front of battery packs 32 protrude forward from support plates 33*b*. The plurality of brackets 33*a* located in front of battery packs 32 are arranged, for example, in two rows in the lateral direction and three brackets are arranged in the upward/downward direction in each row.

While the plurality of battery assemblies AS are fixed by two frames 34, a plurality of (for example, six) brackets 33*a* located in the rear of battery packs 32 protrude rearward from support plates 33*b*. The plurality of brackets 33*a* located in the rear of battery packs 32 are arranged, for example, in two rows in the lateral direction and three brackets are arranged in the upward/downward direction in each row.

Battery frame 31 is supported on frame body 35 with a plurality of (for example, twelve) damper mounts 40 being interposed. Frame body 35 includes pairs of front and rear frame members 36*a* to 36*c*, an attachment frame 38, and a connection frame 39.

One of the pair of front and rear frame members 36*a* is arranged in front of battery frame 31 and the other of the pair of front and rear frame members 36*a* is arranged in the rear of battery frame 31. Each of the pair of front and rear frame members 36*a* includes a pillar portion PRa and a frame plate FBa. Frame plate FBa is, for example, in a form of a flat plate. Pillar portion PRa includes a portion that protrudes upward from an upper surface of frame plate FBa and a portion that protrudes downward from a lower surface of frame plate FBa. Pillar portion PRa is fixed to frame plate FBa, for example, by welding. Pillar portion PRa is provided at each of opposing longitudinal ends of frame plate FBa. Pillar portion PRa may be, for example, in a shape of a pillar (a shape of a column, a shape of a prism, or the like) or in a hollow shape (a cylindrical shape, a shape of a hollow prism, or the like).

One of the pair of front and rear frame members 36*b* is arranged in front of battery frame 31 and the other of the pair of front and rear frame members 36*b* is arranged in the rear of battery frame 31. Each of the pair of front and rear frame members 36*b* includes a pillar portion PRb and a frame plate FBb. Frame plate FBb is, for example, in a form of a flat plate. Pillar portion PRb protrudes upward from an upper surface of frame plate FBb. Pillar portion PRb is fixed to frame plate FBb, for example, by welding. Pillar portion PRb is provided at each of opposing longitudinal ends of frame plate FBb. Pillar portion PRb may be, for example, in a shape of a pillar (a shape of a column, a shape of a prism, or the like) or in a hollow shape (a cylindrical shape, a shape of a hollow prism, or the like).

One of the pair of front and rear frame members 36*c* is arranged in front of battery frame 31 and the other of the pair of front and rear frame members 36*c* is arranged in the rear of battery frame 31. Each of the pair of front and rear frame members 36*c* includes a pillar portion PRc and a frame plate FBc. Frame plate FBc is, for example, in a form of a flat plate. Pillar portion PRc protrudes upward from an upper surface of frame plate FBc. Pillar portion PRc is fixed to frame plate FBc, for example, by welding. Pillar portion PRc is provided at each of opposing longitudinal ends of frame plate FBc. Pillar portion PRc may be, for example, in a shape of a pillar (a shape of a column, a shape of a prism, or the like) or in a hollow shape (a cylindrical shape, a shape of a hollow prism, or the like).

Frame member 36*b* is arranged on frame member 36*a*. Frame member 36*c* is arranged on frame member 36*b*.

Frame member 36*a* is fixed to frame member 36*b*, for example, with such a fastening member as a bolt. Specifically, an upper end of pillar portion PRa in frame member 36*a* is fixed to frame plate FBb of frame member 36*b*, for example, with such a fastening member as a bolt. While frame member 36*a* and frame member 36*b* are fixed to each other, pillar portion PRb in frame member 36*b* is located directly on pillar portion PRa in frame member 36*a*. In this state, pillar portion PRa and pillar portion PRb are arranged, for example, coaxially with each other.

Frame member 36*b* is fixed to frame member 36*c*, for example, with such a fastening member as a bolt. Specifically, an upper end of pillar portion PRb in frame member 36*b* is fixed to frame plate FBc of frame member 36*c*, for example, with such a fastening member as a bolt. While frame member 36*b* and frame member 36*c* are fixed to each other, pillar portion PRc in frame member 36*c* is located directly on pillar portion PRb in frame member 36*b*. In this state, pillar portion PRb and pillar portion PRc are arranged, for example, coaxially with each other.

Coaxially arranged pillar portions PRa, PRb, and PRc constitute a single pillar 37 (FIG. 2). Frame body 35 includes at least one pillar (for example, four pillars) 37. At least one pillar 37 includes a plurality of (for example, two) pillars 37 (first pillars) arranged in front of battery frame 31 as shown in FIG. 2 and a plurality of (for example, two) pillars 37 (second pillars) arranged in the rear of battery frame 31 as shown in FIG. 4(A).

As shown in FIG. 2, each of frame plates FBa, FBb, and FBc arranged in front of battery frame 31 is attached to each of the plurality of (for example, two) pillars 37 (first pillars) arranged in front of battery frame 31.

As shown in FIG. 4(A), each of frame plates FBa, FBb, and FBc arranged in the rear of battery frame 31 is attached to each of the plurality of (for example, two) pillars 37 (second pillars) arranged in the rear of battery frame 31.

As shown in FIGS. 2 and 4(A), each of the plurality of pillars 37 plays a role to bear a load applied to battery frame 31, to prevent interference between battery frame 31 and another component, and to prevent a self-weight of electric excavator 100 from being applied to battery frame 31 in the event of overturn of electric excavator 100.

As shown in FIG. 3, an assembly of frame members 36*a*, 36*b*, and 36*c* is arranged on each of front and rear sides of battery frame 31. The assembly of frame members 36*a*, 36*b*, and 36*c* arranged in front of battery frame 31 and the assembly of frame members 36*a*, 36*b*, and 36*c* arranged in the rear of battery frame 31 are connected to each other by attachment frame 38 and connection frame 39.

Attachment frame 38 is arranged under battery frame 31. Attachment frame 38 is attached to both of frame member 36*a* arranged in front of battery frame 31 and frame member 36*a* arranged in the rear of battery frame 31, for example, with such a fastening member as a bolt. Specifically, attachment frame 38 is attached to both of frame plate FBa (first frame plate) of frame member 36*a* arranged in front of battery frame 31 and frame plate FBa (second frame plate) of frame member 36*a* arranged in the rear of battery frame 31.

Connection frame 39 is arranged above battery frame 31. Connection frame 39 is fixed to both of frame member 36*c* arranged in front of battery frame 31 and frame member 36*c* arranged in the rear of battery frame 31, for example, with such a fastening member as a bolt. Specifically, connection frame 39 is fixed to each of pillar portion PRc in frame member 36*c* arranged in front of battery frame 31 and pillar portion PRc in frame member 36*c* arranged in the rear of battery frame 31.

Battery frame 31 is supported on frame body 35 with the plurality of (for example, twelve) damper mounts 40 being interposed. Damper mount 40 suppresses transfer of vibration, shock, or the like from frame body 35 to battery frame 31, for example, by damping vibration, shock, or the like.

Damper mount 40 may be composed of an elastic material (for example, rubber) or formed from an elastic member (for example, a coil spring), or it may be a feature in which viscous fluid (for example, silicone oil) is sealed. Alternatively, damper mount 40 may be composed, for example, of any combination of the elastic material, the elastic member, and the feature in which viscous fluid is sealed.

The plurality of damper mounts 40 include damper mount 40 located in front of battery frame 31 and damper mount 40 located in the rear of battery frame 31. Damper mount 40 located in front of battery frame 31 is arranged between each of frame plates FBa, FBb, and FBc located in front of battery packs 32 and bracket 33*a*. Damper mount 40 located in the rear of battery frame 31 is arranged between each of frame plates FBa, FBb, and FBc located in the rear of battery packs 32 and bracket 33*a*.

Damper mount 40 is supported on each of frame plates FBa, FBb, and FBc by being inserted in a through hole in each of frame plates FBa, FBb, and FBc and then fixed thereto, for example, with such a fastening member as a bolt. A portion of damper mount 40 that protrudes upward from each of frame plates FBa, FBb, and FBc is fixed to a lower surface of bracket 33*a*. Damper mount 40 is fixed to bracket 33*a*, for example, with such a fastening member as a bolt.

Though the construction in which battery structure body 30 is arranged on main beam MB is described above, a battery attachment support body obtained by removal of battery packs 32 from battery structure body 30 may be arranged on main beam MB. The battery attachment support body is constructed such that all battery packs 32 are removed from battery structure body 30.

The battery attachment support body is constructed to support the battery, or may be constructed to support a battery module or a battery cell instead of battery pack 32. Alternatively, the battery attachment support body may be constructed to support battery pack 32, the battery module, and the battery cell in any combination. Thus, while the battery attachment support body is attached to main beam MB in advance, the battery (battery pack 32, the battery module, the battery cell, or the like) can subsequently be attached to the battery attachment support body.

<Attachment of Battery Structure Body to Revolution Frame>

Attachment of battery structure body 30 shown in FIGS. 2 and 3 to the revolution frame will now be described with reference to FIGS. 4 to 6.

Figure 5:
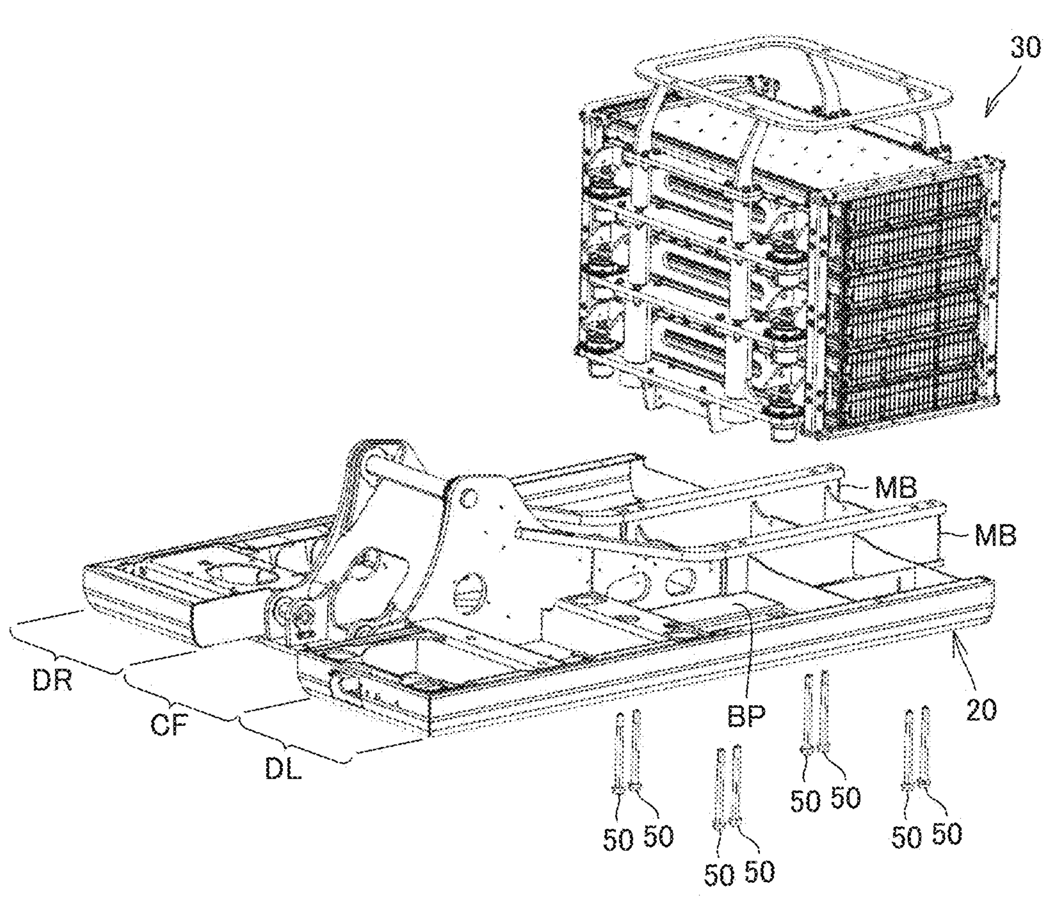
FIG. 5 is a perspective view for illustrating attachment of the battery structure body shown in FIG. 2 to the revolution frame.

FIG. 5 is a perspective view for illustrating attachment of the battery structure body shown in FIG. 2 to the revolution frame. FIG. 6 is a side view showing the state of attachment of the battery structure body shown in FIG. 2 to the revolution frame.

As shown in FIG. 5, battery structure body 30 is attached to main beam MB of revolution frame 20, for example, with such a fastening member 50 as a bolt. Fastening member 50 is fastened to a female screw portion of battery structure body 30 as it passes through main beam MB of revolution frame 20.

As shown in FIG. 4(B), main beam MB includes a pair of left and right standing plates SP and a top plate TP. Each of the pair of left and right standing plates SP is connected to bottom plate BP of revolution frame 20, for example, by welding. Each of the pair of left and right standing plates SP rises upward from bottom plate BP of revolution frame 20. The pair of left and right standing plates SP rises upward as being in parallel to each other with a gap IS lying therebetween.

Top plate TP is connected to both of upper ends of the pair of left and right standing plates SP, for example, by welding. Top plate TP closes gap IS between the pair of left and right standing plates SP. The pair of left and right standing plates SP of main beam MB, top plate TP, and bottom plate BP of revolution frame 20 thus constitute a box structure containing an internal space IS.

A lower end of pillar 37 in battery structure body 30 is in contact with top plate TP of main beam MB. Pillar 37 is located directly on main beam MB.

Through holes BP1 and TP1 for passage of fastening member 50 are provided in bottom plate BP and top plate TP, respectively. Through holes BP1 and TP1 provided in bottom plate BP and top plate TP, respectively, communicate with internal space IS in the box structure.

Fastening member 50 is inserted into through hole BP1 in bottom plate BP from below revolution frame 20, inserted into through hole TP1 in top plate TP through the gap between the pair of left and right standing plates SP (internal space IS in the box structure), and thereafter fastened to battery structure body 30. Battery structure body 30 is thus fixed to main beam MB of revolution frame 20.

Figure 6:
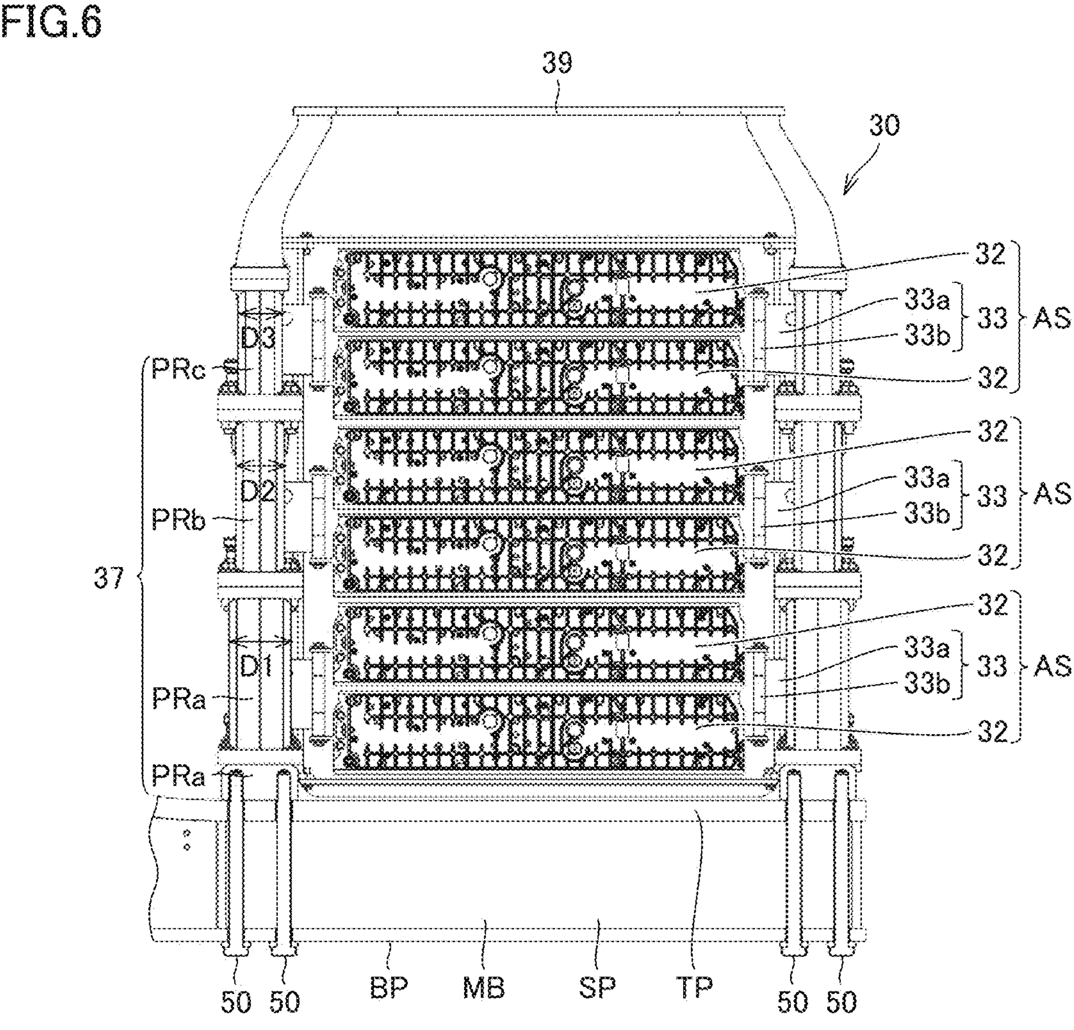
FIG. 6 is a side view showing the state of attachment of the battery structure body shown in FIG. 2 to the revolution frame.

As shown in FIG. 6, for example, two fastening members 50 are fastened to a single pillar 37. Two fastening members 50 fastened to single pillar 37 are aligned in the forward/rearward direction. Each of two fastening members 50 is arranged directly under pillar 37. Fastening member 50 is screwed into a female screw portion provided in a lower surface of pillar portion PRa.

As shown in FIGS. 4(A) and 6, pillar 37 is provided with a lower portion and an upper portion located above the lower portion. Specifically, with pillar portion PRa being defined as the lower portion of pillar 37, pillar portions PRb and PRc fall under the upper portion of pillar 37. Alternatively, with pillar portion PRb being defined as the lower portion of pillar 37, pillar portion PRc falls under the upper portion of pillar 37.

The lower portion of pillar 37 is larger in diameter than the upper portion of pillar 37. Specifically, a diameter D1 of pillar portion PRa is larger than a diameter D2 of pillar portion PRb and a diameter D3 of pillar portion PRc. Diameter D2 of pillar portion PRb is larger than diameter D3 of pillar portion PRc. As the lower portion of pillar 37 is larger in diameter than the upper portion of pillar 37, support of battery structure body 30 by pillar 37 is stabilized.

<Effects>

Effects of the present embodiment will now be described.

When battery structure body 30 or the battery attachment support body is arranged, a member such as a bracket that supports battery structure body 30 or the like is generally added.

In the present embodiment, as shown in FIG. 5, battery structure body 30 or the battery attachment support body is arranged on main beam MB of revolution frame 20. Thus, without new addition of a member such as a bracket other than main beam MB in revolution frame 20 for support of battery structure body 30 or the like, design of main beam MB should only be changed. Therefore, in application of revolution frame 20 of electric excavator 100, battery structure body 30 or the like can appropriately be supported on revolution frame 20 with a simplified structure.

Main beam MB extends in the forward/rearward direction in the central portion in the lateral direction of revolution frame 20. Therefore, battery structure body 30 or the battery attachment support body can be supported in the central portion of revolution frame 20. Centrifugal force at the time of revolution is thus less likely to be applied to the portion of revolution frame 20 that supports battery structure body 30 or the like at the time of revolution of electric excavator 100. Therefore, position displacement of battery structure body 30 or the like with respect to revolution frame 20 due to centrifugal force is less likely.

In the present embodiment, as shown in FIG. 4(A), at least one pillar 37 is located directly on main beam MB. A load applied to pillar 37 by battery structure body 30 or the battery attachment support body can thus directly be born by main beam MB. Therefore, battery structure body 30 or the like can be supported by main beam MB in a stable manner.

As shown in FIG. 4(B), though standing plate SP of main beam MB is connected to each of bottom plate BP and top plate TP by welding on the outside of the box structure, it is not welded to each of bottom plate BP and top plate TP in the inside of the box structure. Therefore, strength of connection between standing plate SP and bottom plate BP and strength of connection between standing plate SP and top plate TP may be insufficient.

In the present embodiment, however, as shown in FIG. 4(B), battery structure body 30 or the battery attachment support body is fixed to main beam MB by being fastened by at least one fastening member 50 that passes between the pair of standing plates SP of main beam MB. By tightening fastening member 50 into the female screw portion of battery structure body 30 or the like, bottom plate BP and top plate TP are pressed against the pair of standing plates SP. Each of strength of connection between standing plate SP and bottom plate BP and strength of connection between standing plate SP and top plate TP can thus be increased.

In the present embodiment, as shown in FIG. 6, at least one fastening member 50 is arranged directly under pillar 37. Battery structure body 30 or the like can thus be fixed by fastening member 50 directly under pillar 37 to which the load of battery structure body 30 or the battery attachment support body is applied. Therefore, battery structure body 30 or the like can securely be supported.

In the present embodiment, as shown in FIG. 3, attachment frame 38 is attached to both of frame plate FBa (first frame plate) located in front of battery frame 31 and frame plate FBa (second frame plate) located in the rear of battery frame 31.

Attachment frame 38 can set a pitch in the forward/rearward direction between pillar 37 supported by frame plate FBa located in front of battery frame 31 and pillar 37 supported by frame plate FBa located in the rear of battery frame 31 to a prescribed pitch. Alignment of battery structure body 30 or the like to revolution frame 20 in attachment of battery structure body 30 or the battery attachment support body to revolution frame 20 is thus facilitated.

<Modification>

A modification of the attachment frame will now be described with reference to FIGS. 7 and 8.

Figure 7:
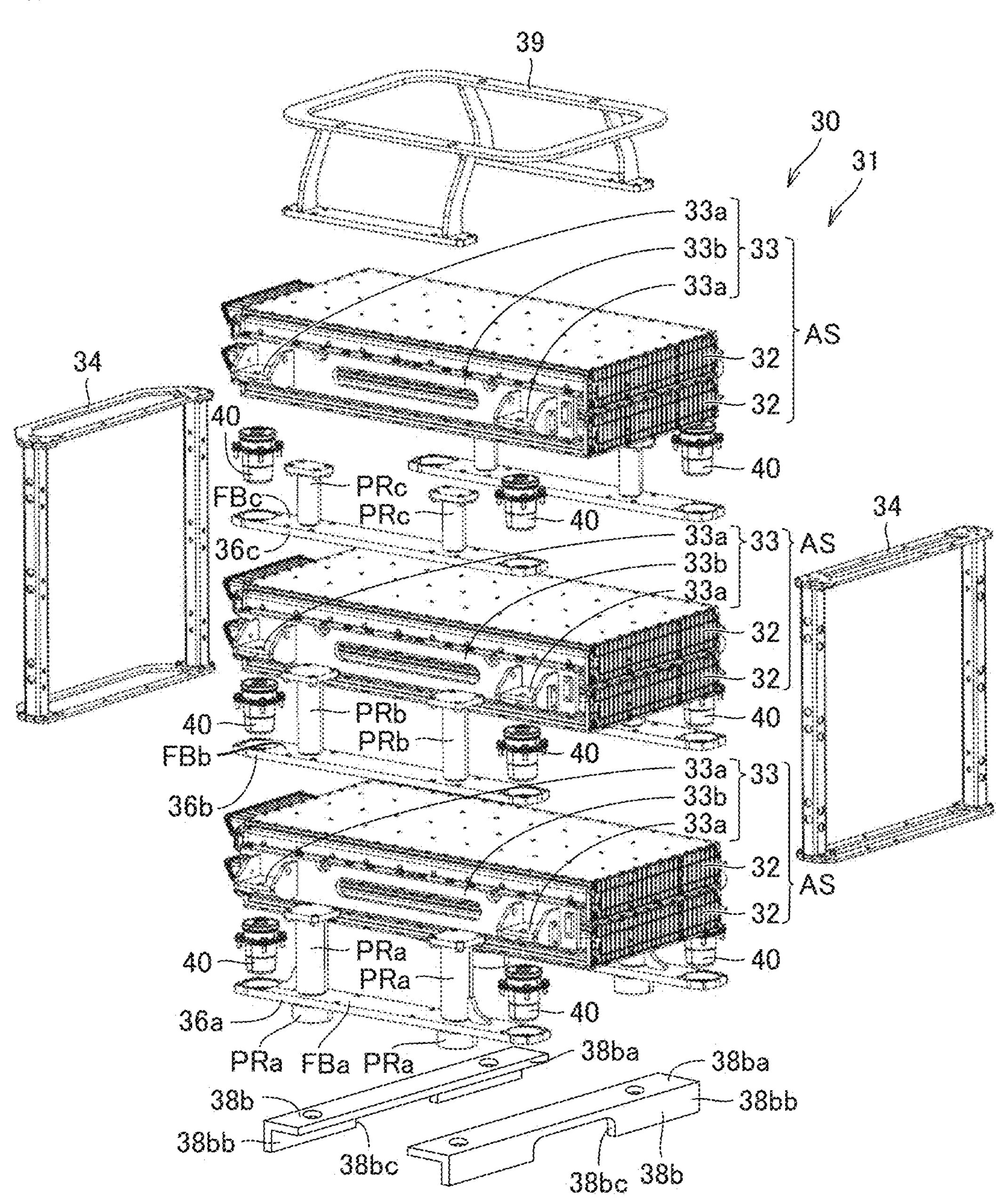
FIG. 7 is an exploded perspective view of the battery structure body including an attachment frame in a modification.

FIG. 7 is an exploded perspective view of the battery structure body including the attachment frame in the modification. FIG. 8 is a perspective view showing attachment of the battery structure body shown in FIG. 7 to the revolution frame.

As shown in FIG. 7, battery structure body 30 in the present modification includes two attachment frames **38*b*. Each of two attachment frames 38*b* includes a lateral plate 38*ba* and a downward extension plate 38*bb***.

Lateral plate **38*ba* is in a form of a flat plate and extends in the forward/rearward direction along main beam MB over main beam MB. Downward extension plate 38*bb* is connected to one lateral end of lateral plate 38*ba*. Downward extension plate 38*bb* extends downward from lateral plate 38*ba*. Downward extension plate 38*bb* is connected to lateral plate 38*ba* over the entire length in the forward/rearward direction of lateral plate 38*ba*. Downward extension plate 38*bb* is provided with a notch 38*bc*** that opens downward.

Lateral plate **38*ba* and downward extension plate 38*bb* may be formed, for example, by bending a single steel material. Attachment frame 38*b* may be formed by connecting downward extension plate 38*bb* to lateral plate 38*ba***, for example, by welding.

Figure 8:
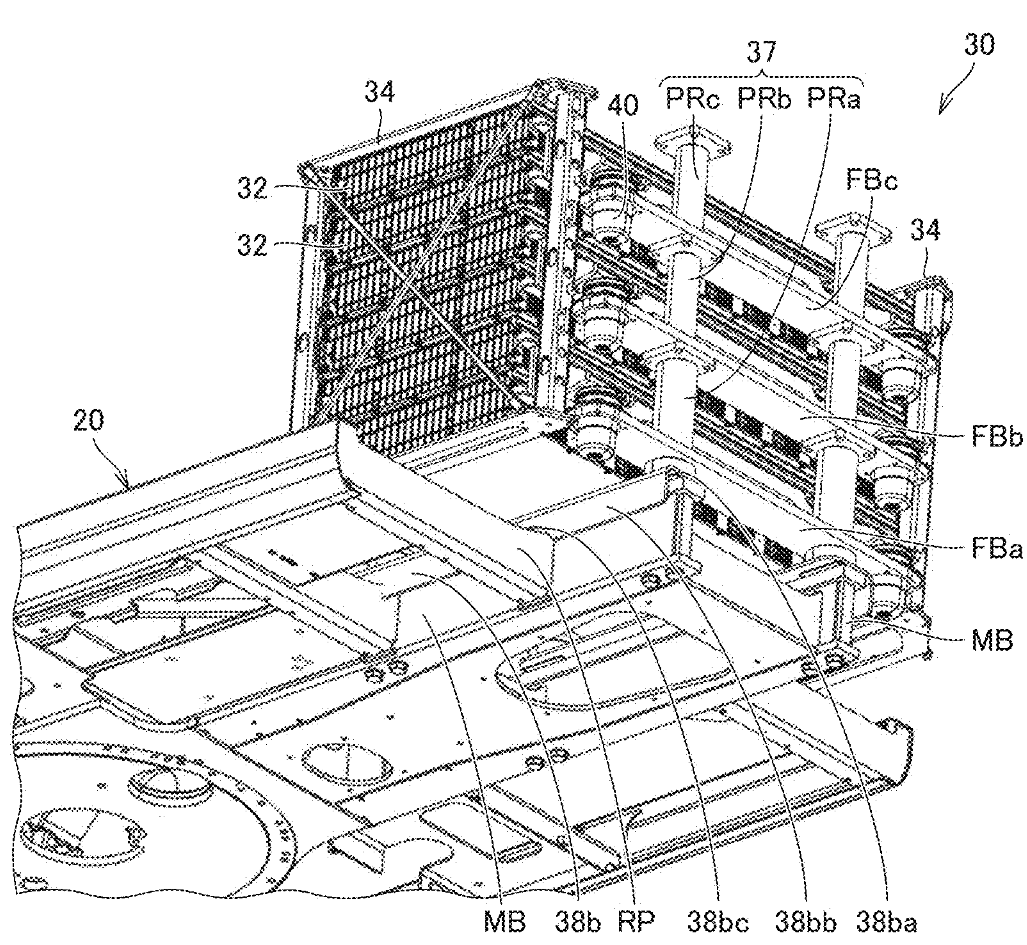
FIG. 8 is a perspective view showing attachment of the battery structure body shown in FIG. 7 to the revolution frame.

As shown in FIG. 8, revolution frame 20 includes a rib portion RP that extends in the lateral direction from main beam MB. Attachment frame **38*b* is attached to the lower end of pillar 37. Attachment frame 38*b* is arranged at the upper end of main beam MB. Attachment frame 38*b* is arranged between main beam MB and pillar 37. While attachment frame 38*b* is arranged on main beam MB, rib portion RP that extends in the lateral direction from main beam MB is received in notch 38*bc* in attachment frame 38*b***.

As described above, attachment frame **38*b* includes lateral plate 38*ba* that extends in the forward/rearward direction along main beam MB over main beam MB and downward extension plate 38*bb* that extends downward from lateral plate 38*ba*. Positioning in the lateral direction of battery structure body 30** with respect to main beam MB is thus facilitated.

Downward extension plate **38*bb* is provided with notch 38*bc* that receives rib portion RP that extends in the lateral direction from main beam MB. As battery structure body 30 is thus arranged such that notch 38*bc* receives rib portion RP, positioning in the forward/rearward direction of battery structure body 30** is facilitated.

A modification of a position of attachment by the fastening member will now be described with reference to FIG. 9.

Figure 9:
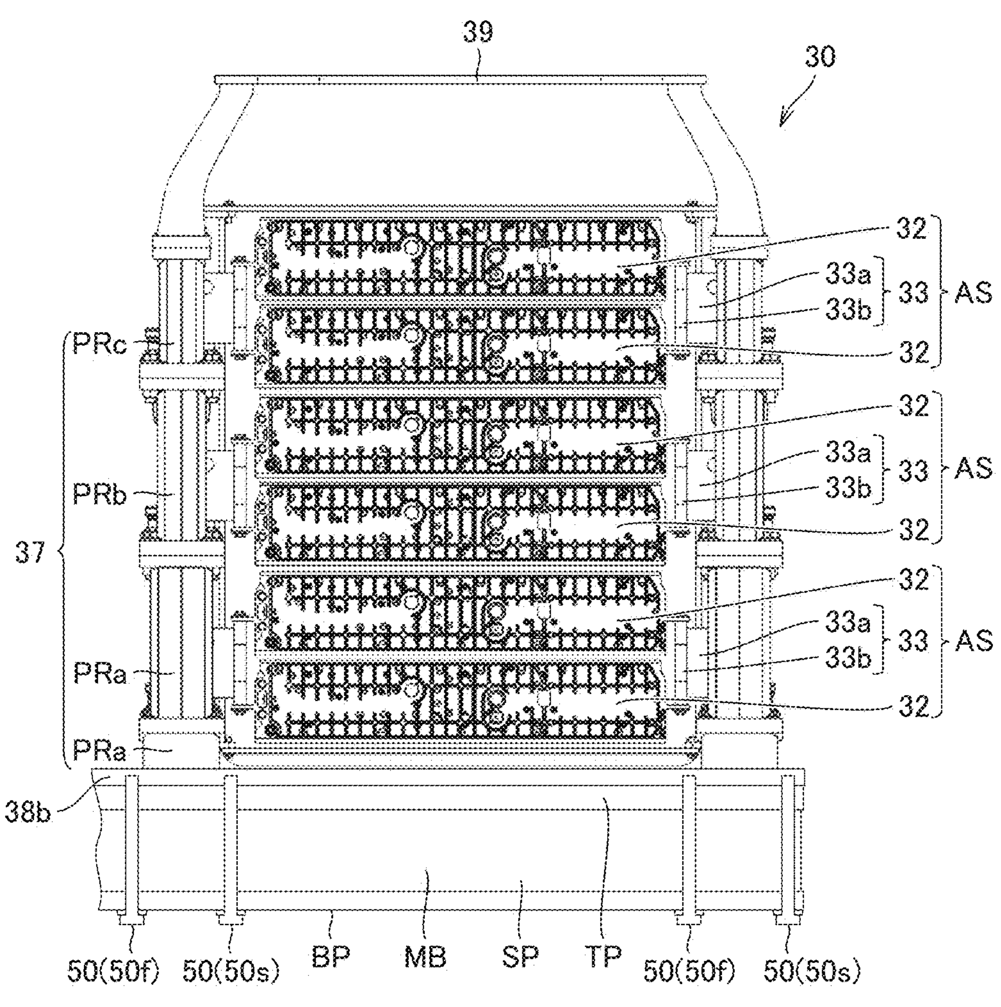
FIG. 9 is a cross-sectional side view showing a modification of a position of attachment by the fastening member.

FIG. 9 is a cross-sectional side view showing the modification of the position of attachment by the fastening member. As shown in FIG. 9, for example, fastening member 50 such as a bolt may be arranged at a location other than the location directly under pillar 37. Specifically, a plurality of fastening members 50 may include a first fastening member **50*f* arranged in front of pillar 37 and a second fastening member 50*s* arranged in the rear of pillar 37. In this case, pillar 37 lies between first fastening member 50*f* and second fastening member 50*s*** in the forward/rearward direction.

In this case, each of first fastening member **50*f* and second fastening member 50*s* may be fastened to attachment frame 38*b*. A male screw portion of each of first fastening member 50*f* and second fastening member 50*s* may be fastened to a female screw portion provided in attachment frame 38*b* or fastened to a nut on attachment frame 38*b* through attachment frame 38*b***.

As first fastening member **50*f* is thus arranged in front of pillar 37 and second fastening member 50*s* is arranged in the rear of pillar 37, tilt (leaning) in the forward/rearward direction of battery structure body 30 is suppressed even when excavation applies an acceleration in the forward/rearward direction of electric excavator 100**.

Since features other than the above of features in the modification shown in FIGS. 7 to 9 are substantially the same as those in the embodiment shown in FIGS. 1 to 6, the same elements have the same reference characters allotted and description thereof will not be repeated. In the modification shown in FIGS. 7 and 8, battery structure body 30 may be the battery attachment support body obtained by removal of battery packs 32.

Though electric excavator 100 without a counterweight is described in each of the embodiment and the modification above, electric excavator 100 may include the counterweight. When electric excavator 100 includes the counterweight, the counterweight may be arranged in the lateral direction of battery structure body 30.

Though frame 34 is described above as the member that fixes the plurality of battery assemblies AS to each other, the plurality of battery assemblies AS may be fixed to each other by a cover member that covers lateral ends of the plurality of battery assemblies AS.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST

1 main body; 2 work implement; 3 revolving unit; 4 operator's cab; 4S operator's seat; 5 travel unit; 5Cr crawler belt; 5M travel motor; 6 boom; 7 arm; 8 bucket; 9 exterior cover; 10 boom cylinder; 11 arm cylinder; 12 bucket cylinder; 13 boom foot pin; 14 boom top pin; 15 arm top pin; 17 bucket link; 20 revolution frame; 30 battery structure body; 31 battery frame; 32 battery pack; 33 bracket body; 33*a* bracket; 33*b* support plate; 34 frame; 35 frame body; 36*a*, 36*b*, 36*c* frame member; 37 pillar; 38, 38*b* attachment frame; 38*ba* lateral plate; 38*bb* downward extension plate; 38*bc* notch; 39 connection frame; 40 damper mount; 50 fastening member; 50*f* first fastening member; 50*s* second fastening member; 100 electric excavator; AS battery assembly; BP bottom plate; BP1, TP1 through hole; CF center frame; DL left deck; DR right deck; FBa, FBb, FBc frame plate; IS internal space (gap); PRa, PRb, PRc pillar portion; RP rib portion; RX revolution axis; SP standing plate; TH1, TH2 through hole; TP top plate.

The invention claimed is:

1. An electric excavator comprising:

a revolution frame including a bottom plate and a main beam that rises upward from the bottom plate, the main beam extending in a forward/rearward direction in a central portion in a lateral direction of the revolution frame;

a battery attachment support body arranged on the main beam of the revolution frame;

wherein the battery attachment support body includes at least one pillar that extends in an upward/downward direction, and the at least one pillar is located directly on the main beam; and wherein the main beam includes a pair of standing plates each rising upward from the bottom plate, and the battery attachment support body is fixed to the main beam by being fastened by at least one fastening member that passes between the pair of standing plates.

2. The electric excavator according to claim 1, further comprising a battery supported on the battery attachment support body.

3. The electric excavator according to claim 1, wherein the at least one fastening member is arranged directly under the pillar.

4. The electric excavator according to claim 1, wherein the at least one fastening member includes a first fastening member arranged in front of the pillar and a second fastening member arranged in a rear of the pillar.

5. The electric excavator according to claim 1, wherein the battery attachment support body includes an attachment frame arranged on the main beam, and the attachment frame includes a lateral plate that extends in the forward/rearward direction along the main beam over the main beam and a downward extension plate that extends downward from the lateral plate.

6. The electric excavator according to claim 5, wherein the revolution frame includes a rib portion that extends in the lateral direction from the main beam, and the downward extension plate is provided with a notch that receives the rib portion.

7. The electric excavator according to claim 1, wherein the battery attachment support body includes a battery frame, an attachment frame, and at least one frame plate, the at least one pillar includes a first pillar arranged in front of the battery frame and a second pillar arranged in a rear of the battery frame, the at least one frame plate includes a first frame plate attached to the first pillar and a second frame plate attached to the second pillar, and the attachment frame is attached to both of the first frame plate and the second frame plate.

* * * * *